350-393 SR 126 T WP SEARCH ROOM
XR 3,806,897

[11] 3,806,897
[45] Apr. 23, 1974

Buchan et al.

[54] ELECTRO-OPTIC IMAGING SYSTEM

[75] Inventors: William R. Buchan, Lincoln; Donald S. Oliver, Acton, both of Mass.

[73] Assignee: Itek Corporation, Lexington, Mass.

[22] Filed: Dec. 1, 1972

[21] Appl. No.: 311,203

[52] U.S. Cl..... 340/173 PP, 250/225, 340/173 LM, 340/173.2

[51] Int. Cl. ........................ G11c 11/42, G11c 11/22

[58] Field of Search.... 340/173 PP, 173.2, 173 LM, 340/173 CR; 250/225

[56] References Cited

UNITED STATES PATENTS

| | | | |
|---|---|---|---|
| 3,740,734 | 6/1973 | Maldonado | 340/173 LM |
| 3,693,171 | 9/1972 | Asam | 340/173 LM |
| 2,972,082 | 2/1961 | Kallmann | 340/173 PP |
| 3,517,206 | 6/1970 | Oliver | 340/173 PP |

OTHER PUBLICATIONS

Taylor, Bismuth Titanate–Photoconductor Optical Storage Medium Technical Report AFAL–TR–70–61, 4/70, prepared by RCA under U.S. Air Force Contract F33615–69–C–1029.

Beam, Charge–Storage Beam–Addressable Memory, IBM Technical Disclosure Bulletin, Vol. 9, No. 5, 10/66, pp. 555–556.

*Primary Examiner*—Bernard Konick
*Assistant Examiner*—Stuart N. Hecker
*Attorney, Agent, or Firm*—Homer O. Blair; Robert L. Nathans; David E. Brook

[57] ABSTRACT

An electro-optic imaging system including an electro-optic device including a photosensitive electro-optic birefringent medium whose birefringence varies as a function of an applied electric field; means for applying a voltage across the device and periodically reversing the polarity of that applied voltage; and means for selectively varying the electric field across the medium for placing information in the medium during a period in which the voltage applied to the device has a first polarity.

17 Claims, 15 Drawing Figures

3806897
OR IN 365/120

ELECTRO-OPTIC IMAGING SYSTEM

CHARACTERIZATION OF INVENTION

The invention is characterized in an electro-optic imaging system including an electro-optic device having an optical characteristic which varies in response to variations in an applied electric field; means for applying a voltage across the device and periodically reversing the polarity of that applied voltage; and means for varying the electric field within the device for placing information in the device during the period in which the voltage applied to the device has a first polarity.

FIELD OF INVENTION

This invention relates to an electro-optic imaging system and more particularly to such a system which compounds a portion of the voltage applied to it in one period with that applied in the next.

BACKGROUND OF INVENTION

There is a constant demand for ever faster and larger memories for use with computers and other information processing systems. One recent attempt to increase both speed and capacity uses a laser beam to write on selected addressable bit locations on a page composer, and then uses a second laser beam to read out the information image on the page composer and reproduce it as a hologram on a memory which contains a number of page locations. The memory may be read out using a laser to select the desired page hologram and reproduce the bit pattern on the page composer which has a photodiode or similar detector at each bit address to convert the optical input to electrical signals. In one approach the page composer uses a liquid crystal combined with photosensitive deposits to perform the read in. A photosensitive deposit is located at each bit location. The photosensitive deposits and liquid crystal are disposed between electrodes. The read in laser beam is either energized or blanked at each bit location; where it is energized the photosensitive deposit conducts more current; where it is blanked there is no conduction increase. Increasing the current to a liquid crystal increases its tendency toward scattering light. Depending upon the condition of each of the deposits then, the read out radiation will either pass through this page composer to the memory or be scattered. One of these conditions can be designated a binary one and the other a zero. The memory used in this approach is a thin film of Mn Bi a substance which can be magnetized perpendicular to the surface in which the hologram is produced by Curie-point writing and read out by Kerr or Faraday effects. For see: "An Optical Read-Write Mass Memory," J. A. Rajchman, Applied Optics, Vol. 9, No. 10, P. 2269, Oct. 1970 and "Optics for a Read-Write Holographic Memory," Stewart and Consentino, Applied Optics, Vol. 9, No. 10, P. 2271, Oct. 1971 and references cited therein. Such systems are quite complex in that each discrete bit location of the liquid crystal is electrically addressed and the liquid crystal requires a substantial period of time to recycle before the next page of bits can be read into it. A typical minimum cycle time is 5 to 10 milliseconds, or only 500 operations per second.

SUMMARY OF INVENTION

Thus it is desirable to have available a new and improved simple and extremely high speed imaging system.

It is also desirable to have available such an imaging system which has an extremely high resolution and consequent large capacity for individual items or bits of information.

It is also desirable to have available such an imaging system which may be used as a highly efficient extremely high speed, high capacity page composer.

The invention results from the discovery that blocking electrodes or other dielectric members when combined with a photosensitive electro-optic medium cause a retention of a portion of the applied voltage and that by periodically reversing the polarity of that voltage write and read and/or erase operations can be performed at high speed and a compound voltage of approximately twice the amplitude of the applied voltage may be developed across the medium to produce a twofold increase in the response of the optical characteristic e.g., twice the retardation and about four times the light output in the case where the medium exhibits electrically induced birefringence.

The invention may be accomplished by an electro-optic imaging system including an electro-optic device which has first and second spaced blocking electrodes, and an electro-optic medium disposed between those electrodes. The electro-optic medium has an optical characteristic which varies in response to variations in an applied electric field.

Typically the device has a plurality of addressable locations and in preferred embodiments the optical characteristic is electrically induced birefringence. There are means for applying a voltage across the device and periodically reversing the polarity of that applied voltage. Further means are provided for selectively varying the electric field across the medium at the locations for placing information in the device during a period in which the voltage applied to the device has a first polarity.

DISCLOSURE OF PREFERRED EMBODIMENT

Other objects, features and advantages will occur from the following description of a preferred embodiment and the accompanying drawings in which.

Figure 1:
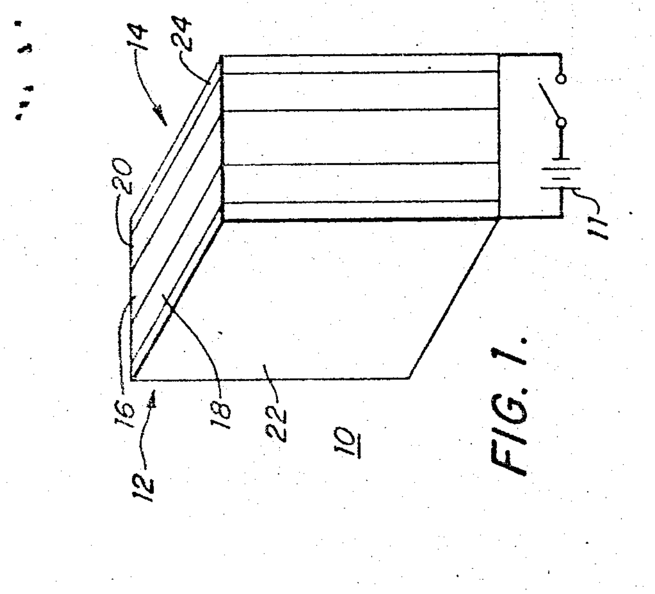
FIG. 1 is a diagrammatic, axonometric view of an electro-optic device which may be used in an imaging system according to this invention.

There is shown in FIG. 1 an electro-optic device 10 according to this invention including a pair of transparent blocking electrodes 12 and 14 connected to battery 11; by blocking electrodes is meant electrodes which do not inject charge, such as may be the case with conducting electrodes. Between electrodes 12 and 14 is a photosensitive electro-optic medium 16 which has an optical characteristic that varies as a function of the applied field. In preferred embodiments that optical characteristic is electrically induced birefringence. Typically, when the voltage is increased across such an electro-optic birefringement medium the differential retardation imposed by that medium on appropriately polarized radiation passing through it is likewise increased. Such an electro-optic birefringement medium may be used as a radiation modulator wherein the light transmitted by it and associated polarizers varies with a voltage signal applied to its electrodes or it may be used as an optical detector for electrical signals wherein the radiation passing through it is detected as representative of the voltage signal applied across the electrodes. For example, if radiation plane polarized in a first direction bisecting the axes of birefringence is submitted to transparent electrode 12 and a voltage is applied across electrodes 12 and 14 the radiation transmitted through electrode 14 will be elliptically polarized by an amount proportional to the differential retardation imposed by medium 16 resulting from the voltage applied across electrodes 12 and 14. Thus if an analyzer such as a polarizing element is placed adjacent electrode 14 it may be used to pass a selected component of the elliptically polarized radiation and thus permit sensing of the retardation induced by medium 16 which in turn indicates the amount of voltage applied to electrodes 12 and 14. For example, if the plane of polarization for such an analyzer were parallel to that of the input radiation then the major axis component of the ellipse would be passed and a decreasing amount of light transmitted by such an analyzer element would indicate an increase in voltage applied to the electrodes 12 and 14. Whereas, if that analyzer element were oriented with its plane of polarization orthogonal to that of the input radiation, the minor axis component would be passed and an increase in the amount of radiation passing through the element would indicate an increase in the voltage applied to electrodes 12 and 14.

Typically, blocking electrodes 12 and 14 each include a dielectric member 18 and 20, respectively, and a conducting electrode 22 and 24, respectively. The conducting electrodes may be, for example, vapor deposited platinum. Dielectric members 18 and 20 may be Parylene-C (a class of p-xyLylene Polymers manufactured by the Union Carbide Corp.) and the photosensitive electric-optic medium 16 may be cubic zinc selenide. Zinc selenide is suitable in a high speed device because good crystals of this material exhibit a low density of trapped charge carriers thus permitting short cycle times. In lower speed devices materials having slower decay characteristics are desirable to minimize the rate of decrease of the voltage during the extended cycle time. Materials such as bismuth silicon oxide or cubic zinc sulfide are therefore suitable for lower speed devices. If it is desired to operate device 10 in a reflective manner as opposed to a transmitting manner i.e., input radiation entering from electrode 12 passes through medium 16 and is reflected back out through the same electrode 12, then electrode 14 may be formed of highly reflective material such as aluminum or a multilayer dielectric mirror may be used. Operation in a reflective mode is often desirable because the radiation is compelled to move through the medium 16 in a path which is twice as long as it would pass through if it were merely transmitted. Since the differential retardation of radiation passing through such a medium is a function of the distance it moves through the medium as well as of the electric field existing in it, doubling the length of the path of radiation through such a medium also doubles the retardation. In the previous example wherein a crossed analyzer was used this doubling results in approximately a fourfold increase in the output light which increases the contrast factor between the dark and light conditions or the voltage and no voltage conditions by a factor of about four.

Figure 2:
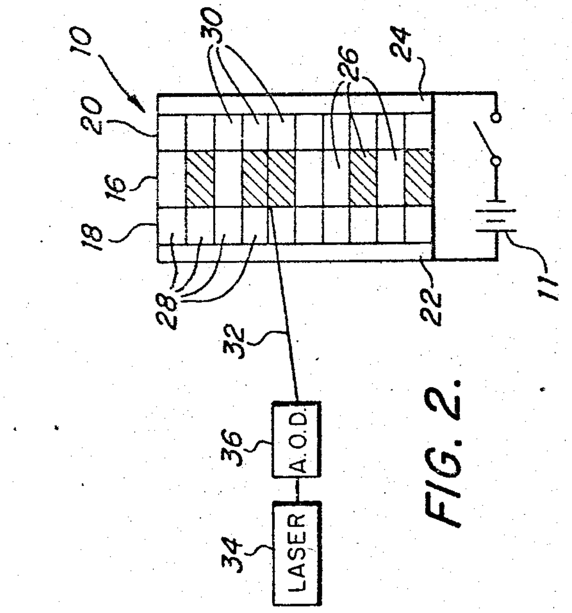
FIG. 2 is a diagrammatic, cross sectional view of the device of FIG. 1 illustrating a technique for writing information into the device using a laser.

Although in FIG. 1, device 10 has been discussed as if it were capable of controlling a single radiation beam or alternatively sensing a single radiation beam that is not a limitation. For example, in FIG. 2 device 10 is shown as having a plurality of discrete areas 26 in medium 16 and corresponding areas 28 and 30 on dielectric members 18 and 20, respectively; each of these areas may constitute a unique addressable storage location. In FIG. 2 and all subsequent figures like parts have been give like reference numbers and similar parts like numbers primed. A simple single crystal medium such as disclosed with reference to medium 16 is capable of storing 10,000 such locations in an area of 1/16 of a square inch. Thus the device 10 may be used for imaging, and if desirable storing, the image of a pattern of bits which may represent binary data or which may represent a pattern of binary data or a photographic image or any other image. Typically medium 16 may be a single slab of cubic zinc selenide 100–200 microns thick, dielectric layers 18 and 20 are single slabs of Parylene-C 3–6 microns thick, and electrodes 22 and 24 are very thin evaporated metal. For clarity in FIG. 2 device 10 is shown as having only ten such locations i.e., areas 26 in the vertical direction and might have an equal number in the horizontal direction so that it would contain only 100 such unique locations corresponding to the areas 26. The retardation of each of the areas 26 of medium 16 may be modified by selectively varying the electric field across each of those areas 26. Typically a voltage of approximately 1,000 to 2,000 volts may be applied by battery 11 or similar source across electrodes 22 and 24. Laser beam 32 generated by laser 34 and having a wavelength to which the photosensitive characteristic of medium 16 is sensitive is swept across the face of device 10 at electrode 22 by means of an acousto-optical deflection unit 36 such as an Acousto Optic Beam Deflector, Model No. D-70R, manufactured and sold by Zenith Radio Research Labs. Beam 32 may be swept across the face of device 10 in accordance with any pattern. Typically a raster such as used in a conventional television receiver wherein the beam follows a path composed of a vertical stack of horizontal paths may be used. As beam 32 is thus swept across and down the face of electrode 22 it may be blanked or energized either by interrupting the beam or controlling the operation of laser 34 so that at the time the beam 32 strikes any particular area 26 that beam is either bright or dark depending upon whether the information bit is to be a zero or one.

In FIG. 2 the crosshatched areas 26 indicate areas which are struck by beam 32 when beam 32 is energized; the uncrosshatched areas 26 indicate areas which are struck by beam 32 when it was dark or blanked. Crosshatched areas 26 thus become more conductive than the uncrosshatched areas 26 because of the photosensitive characteristic of medium 16. Thus the electric field is reduced across the crosshatched areas 26 but is not reduced or is reduced very little across the uncrosshatched areas 26. As a result, the retardation which will be imposed by the crosshatched areas on transmitted radiation will be considerably less than the retardation imposed by the uncrosshatched areas. In this manner an image may be produced in storage device 10.

Figure 3:
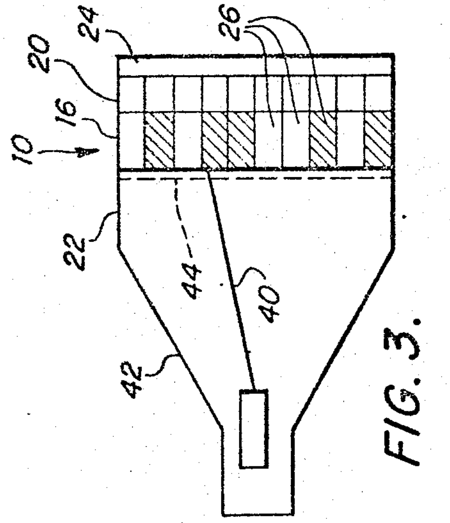
FIG. 3 is a cross sectional, diagrammatic view of the device shown in FIG. 2 showing an alternate scheme using an electron beam for writing information into the device.

This technique of producing an image in device 10 is not restricted to the use of a laser or even to other forms of light sources. For example, an electron beam 40, FIG. 3, generated in a cathode ray tube 42 may be energized and swept across medium 16 in the same manner as was laser beam 32 to produce an image pattern in medium 16. Electrons from beam 40 impinging on medium 16 place an electric charge directly on medium 16 thereby creating an electric field across it. When an electron beam is used to vary the electric field across area 26 of medium 16 greater efficiency can be obtained by using a phosphor coating 44 which produces a large number of photons for each impinging electron thereby increasing the effect of the beam on areas 26 and improving the light output derived during subsequent readouts.

Readout on device 10 may be accomplished using a laser to which photosensitive electro-optic birefringent medium 16 is less sensitive in respect to its photosensitive characteristic. Thus for example, laser 34 in FIG. 2, may be a blue light for changing the conductance of the photosensitive portion of medium 16 and the readout laser 46, FIG. 4, may produce radiation of a longer wavelength, for example, in the yellow region, which is much less efficient at changing the conductance of medium 16. Laser 46 produces a beam 48 of light which is deflected about the face of device 10 by means of an acousto-optical deflector 50 similar to deflector 36. Beam 48 is appropriately polarized with respect to the axes of birefringence in medium 16 by means of a polarizer element 52 which, in this illustration, produces polarization in the vertical plane as indicated by arrow 54. Thus polarized beam 48 is swept across the face of device 10 at electrode 22 in some predetermined raster and encounters areas 26 which exhibit less electrically induced birefringence — the crosshatched areas, or more electrically induced birefringence — the uncrosshatched areas, depending upon whether the electric field across medium 16 at that area is lower or higher, respectively, which in turn is a function of whether that area has been struck by more light or less light during the reading in process as described in FIGS. 2 and 3.

In this manner polarized beam 48 is modulated in accordance with the electric field across medium 16 which varies from area to area throughout device 10. The differential retardation imposed upon polarized beam 48 by areas 26 result in beam 48 becoming elliptically polarized less or more as indicated by ellipses 55 and 57. An analyzer 56 disposed adjacent electrode 24 may be a crossed polarizer element i.e., its polarization axis is oriented orthogonal to that of element 52, in the horizontal direction, as indicated by the arrow 58. Thus the greater the differential retardation imposed on beam 48, the greater will be the minor axes of the ellipses 55 and 57 indicated by the arrows 55′ and 57′ and the greater will be the output radiation from analyzer 56. Therefore the amount of light transmitted by element 56 is dependent on the amount of retardation imposed by the particular area through which the beam is passing at that moment. Thus light in various degrees of elliptical polarization, as indicated by the arrows 55′ and 57′, is available at the output of device 10. Thus light polarized as at 57′ will have greater magnitude 57″ at the output of detector 56 than light polarized as at 55′ represented at 55″. A lens 60 may be used to collect the radiation transmitted by analyzer 56 and focus it on photocell 62 or a similar device. In this manner an analyzer may be used to detect the condition of the device with the addition of a photocell and lens. In the discussion with reference to polarization indicating arrows 55, 57 and 55′, 57′ it is assumed that a dark area 26 is nearly totally dark and effects maximum retardation or change in polarization of the transmitted radiation whereas the areas which have been light struck produce minimal retardation of the radiation transmitted by them. However, this is not a necessary limitation of the operation of these devices. For example, there may be less or more retardation of the radiation field by the light struck areas. The essential consideration is that there be enough difference between the degree of elliptical polarization of the radiation beam passing through these light struck and dark struck areas 26 to produce a magnitude difference at the output of element 56 which is discernable by photosensor 62 and subsequent circuits. It should also be appreciated that device 10 is capable of reading out a great number of different degrees of elliptical polarization. Thus device 10 is not restricted to being a binary device; it may have many levels of difference. For example, if photographic images were being imaged in device 10 there might be hundreds of different levels indicated which could be presented to device 10 by having hundreds of different levels of intensity of beam 32, FIG. 2, during the write operation on areas 26.

Figure 4:
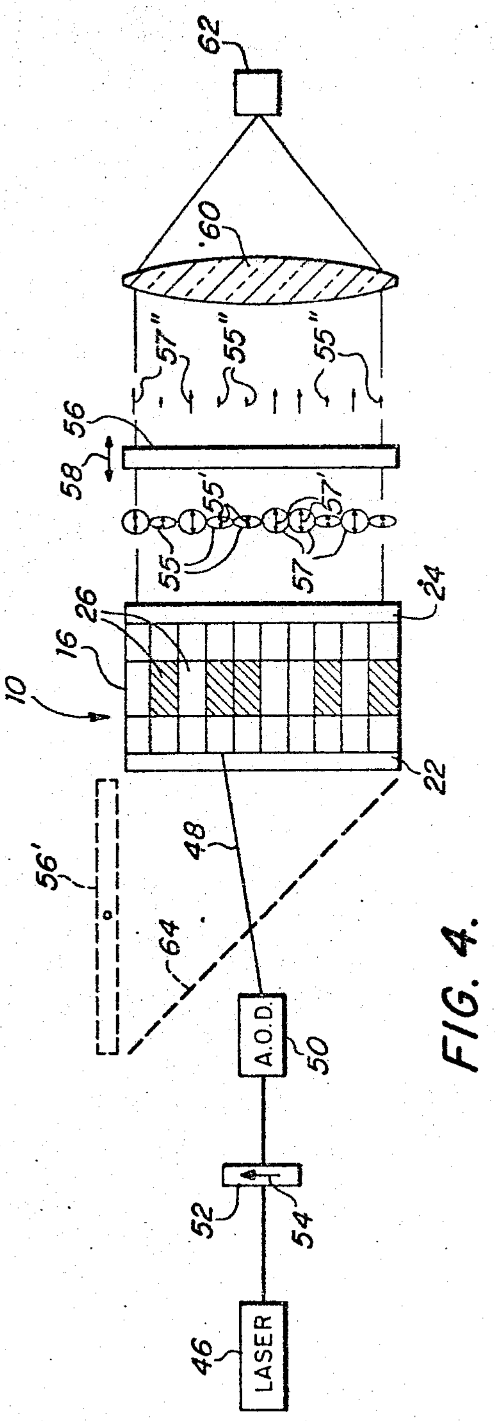
FIG. 4 is a cross sectional, diagrammatic view of the device in FIG. 1 showing schematically a system of serially reading out information present in the device.

Since the degree of elliptical polarization of the radiation being transmitted by device 10 is a function of the retardation imposed upon it and since the light output and efficiency of device 10 is a function of the retardation it may be desirable rather than transmitting readout beam 48 through device 10, to provide a highly reflecting electrode at electrode 24 such as highly polished aluminum whereby beam 48 may be transmitted through medium 16 and then reflected back through it again in order to double the retardation imposed upon the beam and thus substantially increase the light output from analyzer element 56. This can be done using a beam splitter such as mirror 64, FIG. 4, shown in phantom, to direct the reflected beam through an analyzer element 56'. Although analyzer elements 56 and 56' are both shown as being crossed polarizers i.e., their plane of polarization is orthogonal to that of polarizer 52, this is not a necessary limitation. With device 10 constructed as shown a crossed polarizer produces a negative reproduction of the image presented to device 10. However, if a positive image is desired the plane of polarization of analyzer 56 may be oriented parallel to that of polarizer 52.

Figure 5:
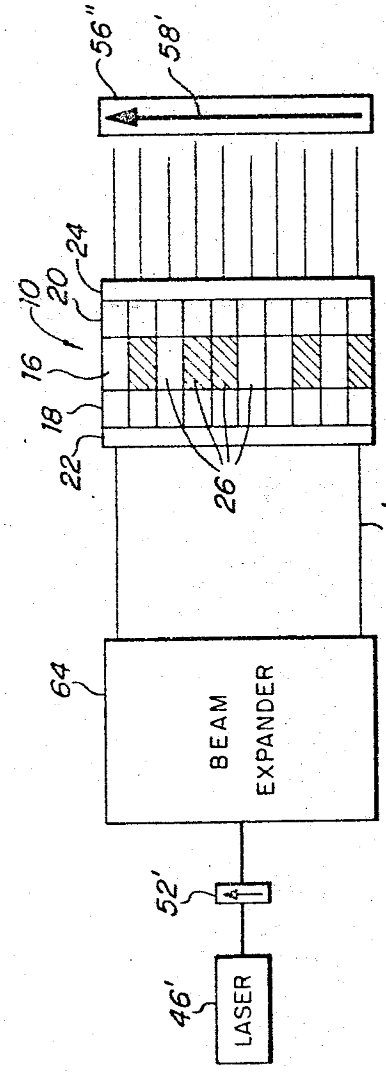
FIG. 5 is a view of a system similar to that shown in FIG. 4 using a parallel read out scheme.

The readout operation of device 10 need not be restricted to a serial mode; for example, a readout laser 46', FIG. 5, and polarizer 52' may be submitted to a beam expander or collimator 64 to produce an expanded laser beam 48' so that it encompasses the entire area of device 10 at electrode 22 so that the entire image present in device 10 can be read out at once. This type of operation with parallel readout is necessary, for example, when device 10 is used as a page composer for holographic memory, because the hologram is formed by the simultaneous interaction of radiation emanating from the whole surface of the page composer with a reference beam incident on the storage medium. In this case the parallel readout can be made very rapid by using a brief high power laser pulse for beam 48', thus enabling high page rates to be attained. In these circumstances the device 10 is required to store information only for relatively short times, of the order of $10^{-4}$ to $10^{-3}$ seconds, in which case medium 16 is required to exhibit low leakage of electric charge only during such short periods of time; for example, medium 16 may exhibit a resistivity in the dark of $10^{9}$ – $10^{10}$ ohm cm. On the other hand when a relatively long cycle time is used, for example, of the order of 0.1 second, then medium 16 must exhibit a higher dark resistance of the order of $10^{12}$ ohm cm or greater.

Analyzer 56'' is shown with a polarization direction, arrow 58', having the same orientation as polarizer 52' to produce a positive image upon readout of device 10. To produce the high speed imaging device of this invention using electro-optic device 10 it is necessary that an extremely high speed system be used for writing, reading and erasing information in areas 26 of medium 16.

Figure 6:
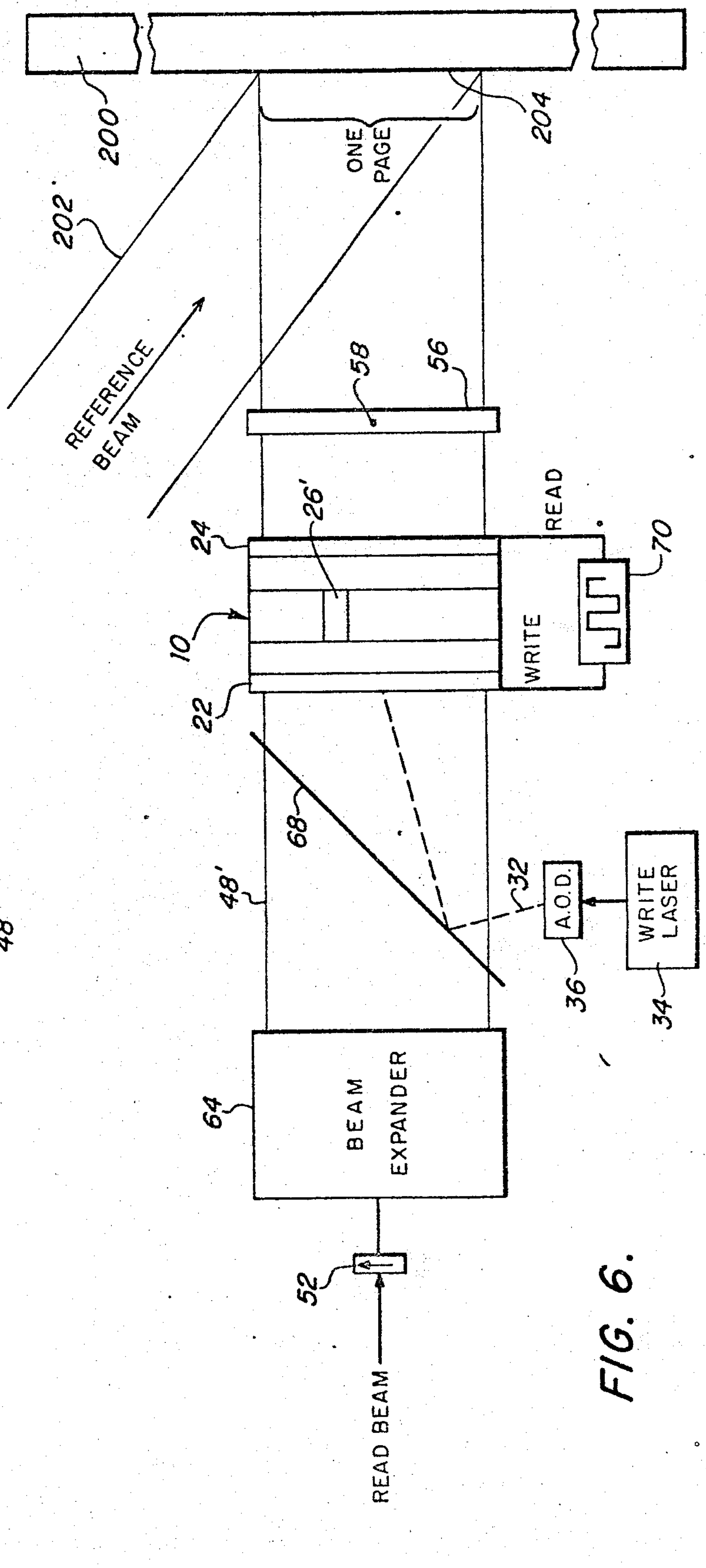
FIG. 6 is a schematic diagram showing a system according to this invention using the device of FIG. 1 as a page composer and illustrating one form of memory in which the composed page may be stored.

In one embodiment, FIG. 6, a beam splitter mirror 68 is interposed between beam expander 64 and device 10 to permit the writing beam 32 as well as the reading beam 48' to have access to device 10. In one implementation a high frequency pulse generator 70 is connected to energize electrodes 22 and 24 so that electrode 22 is positive and electrode 24 negative during the time that device 10 is exposed to writing beam 32 and electrode 24 is positive and electrode 22 is negative during the time that device 10 is being subject to the reading beam 48'. For example, pulse generator 70 may be a square wave generator which produces a 10 KHz square wave.

Figure 7:
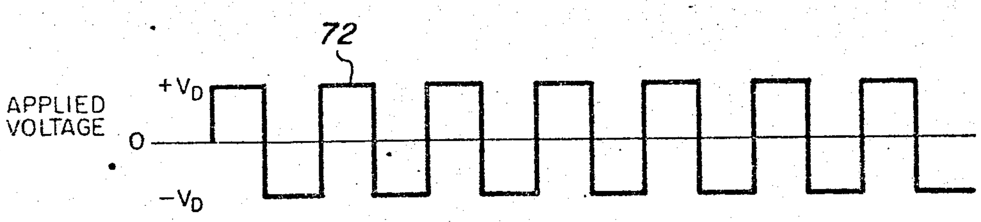
FIG. 7 is a diagram showing the train of pulses which is applied to the device in FIG. 6.
Figure 8:
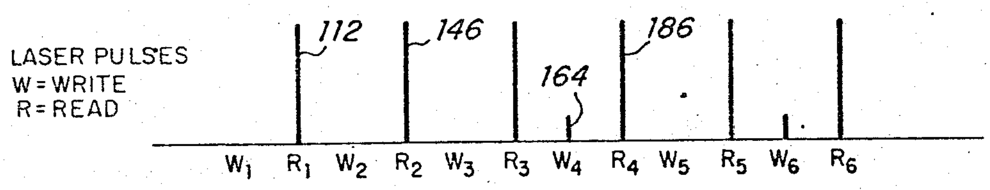
FIG. 8 is a timing diagram showing the write pulses delivered by the write laser of FIG. 6 to one specific information area or location in the device in FIG. 6 in six successive cycles of operation and the read pulses supplied to all the information areas in the device of FIG. 6 during each of those six cycles of operation.
Figure 9:
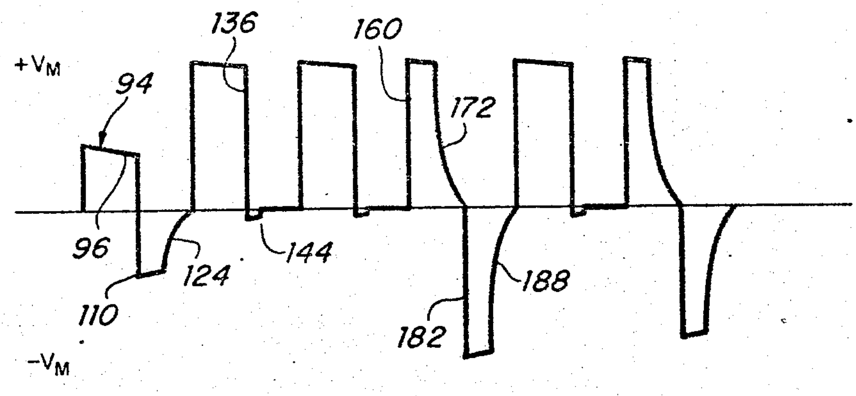
FIG. 9 is a diagram showing the voltage across and the retardation imposed by the photosensitive electro-optic medium in the device in the system of FIG. 6 at the specific information area during the read/erase portions of each of the six cycles of operation.
Figure 10:
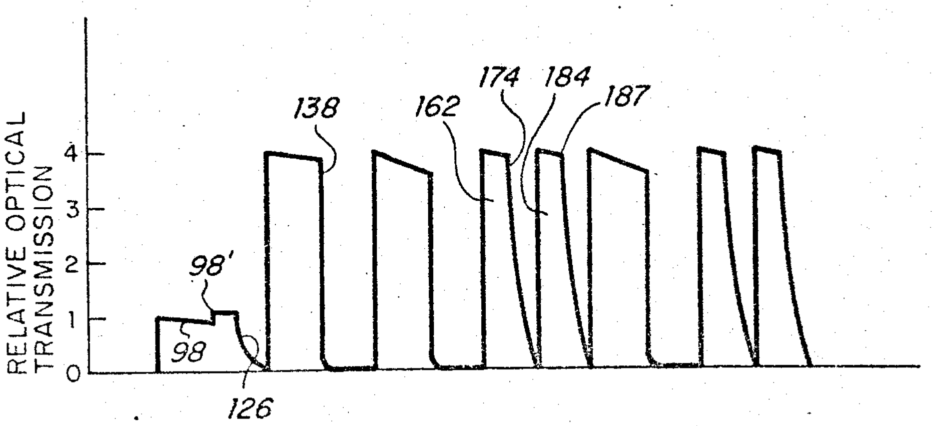
FIG. 10 is a diagram showing the relative optical transmission of that specific information area during the write and read/erase portions of each of the six cycles of operation.
Figures 11, 12, 13, 14:
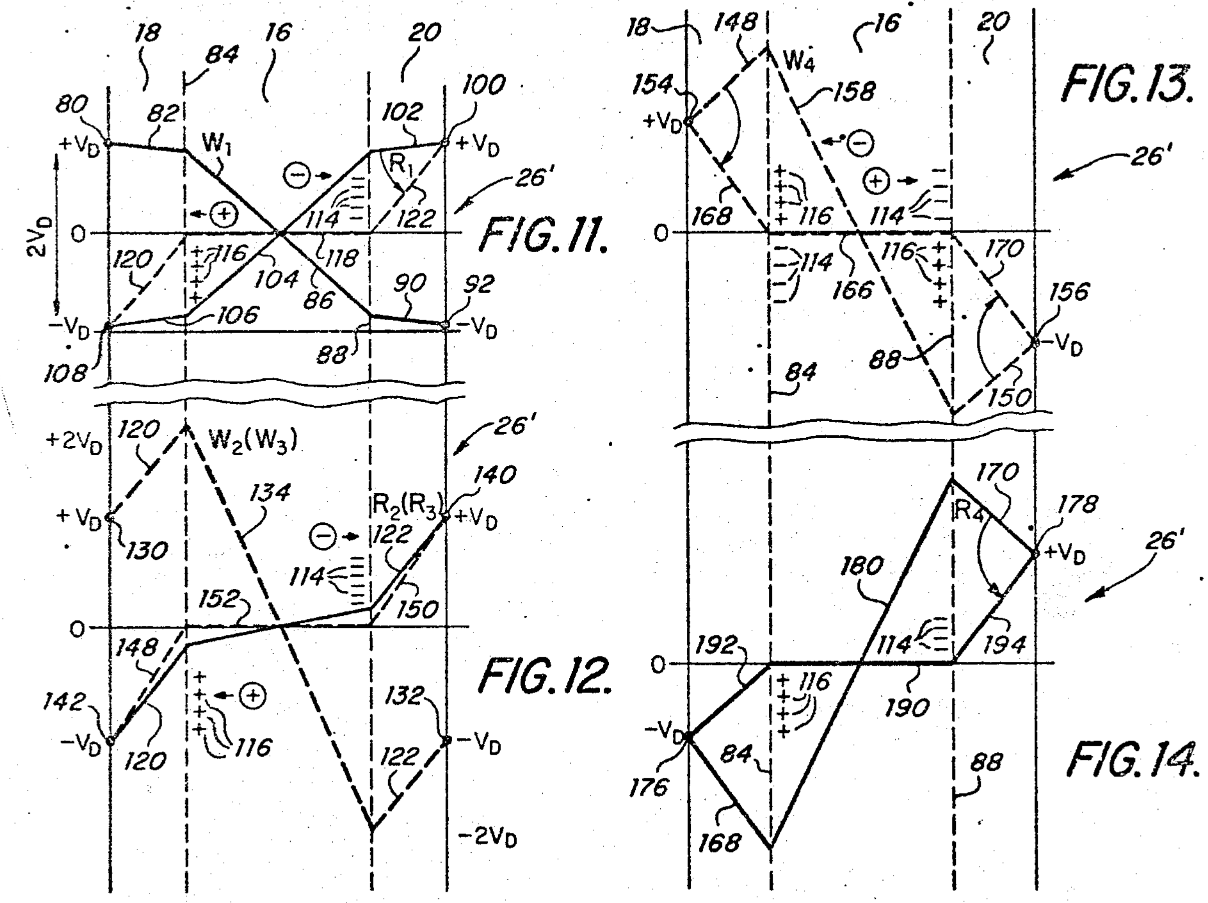
FIG. 11 depicts the voltages across the photosensitive electro-optic medium and adjacent blocking electrodes during the write portion of the first cycle and the read/erase portion of that cycle before and after the read out pulse occurs.
FIG. 12 is a diagram similar to FIG. 11 for the second cycle of operation and which is illustrative of conditions in the third cycle of operation as well.
FIG. 13 is a diagram similar to FIG. 11 for the write portion of the fourth cycle of operation.
FIG. 14 is a diagram similar to FIG. 11 for the read and erase portion of the fourth cycle both before and after the read pulse occurs.

In the following discussion of the operation of the imaging system of FIG. 6 reference will also be made to FIGS. 7, 8, 9, 10, 11 and 12. FIG. 7 depicts the square wave 72, generated by pulse generator 70, whose positive and negative portions are symmetrical about zero and have a magnitude of $+V_D$ and $-V_D$, respectively. FIG. 8 depicts the write and read/erase laser pulses to which one area 26 of medium 16 might be subjected during a number of write and read/erase cycles. FIG. 9 depicts the voltage and retardation across that particular area 26 during a sequence of write and read/erase cycles. FIG. 10 depicts the relative optical transmission of the system of FIG. 6 i.e., the output of analyzer 56 throughout the write and read cycles. FIG. 11 depicts the voltage and electric field developed across dielectric members 18 and 20 and medium 16 during the first write and read/erase cycle superimposed on a schematic of the device 10. FIG. 12 depicts the voltage and electric field developed across dielectric members 18 and 20 and medium 16 during the second and third write and read/erase cycle superimposed on a schematic of the device 10. FIG. 13 depicts the voltage and field across dielectric members 18 and 20 and medium 16 during a fourth write cycle superimposed on a schematic of the device 10. FIG. 14 depicts the voltage and field across dielectric members 18 and 20 and medium 16 during a fourth read/erase cycle superimposed on a schematic of the device 10. Although the square wave pulse signal 72, FIG. 7, is shown having symmetry in both the amplitude and time axes i.e., the voltage magnitude of the positive pulses is equal to that of the negative pulses and the width of the positive pulses is equal to that of the negative pulses, that is not a critical limitation of the invention. The magnitude and the width of the positive and negative pulses may be different and the magnitude and width may vary from pulse to pulse. In fact the pulse magnitude may vary from a more positive level to a less positive level or even zero without actually becoming negative: then the polarity reversal would be achieved by interchanging the application of the more positive and less positive levels. The same can be said to apply for negative levels. In FIG. 6 the write operation takes place during the first part of the cycle and the read/erase operation takes place during the second part of the cycle. In this simple illustration wherein the information presented to device 10 is binary in form, the write beam 32 is either blanked to represent a zero or it is permitted to impinge on device 10 at full brightness to represent a one. During the read/erase portion of the cycle read beam 48' is submitted at full brightness to device 10. In FIG. 6 device 10 is considered to have 10,000 discrete locations and so the write beam 32 is swept over each of the 10,000 locations, all in one half of a cycle of the 10,000 cycles per second square wave produced by pulse generator 70.

Initially during the first write period $W_1$, FIG. 8, with a positive voltage applied to electrode 22 and a negative voltage applied to electrode 24 the voltage distributed across members 18 and 20 and medium 16 at the area 26' under observation is shown in FIG. 11. The full voltage $+V_D$ appears at point 80 at the interface of member 18 and electrode 22; the voltage decreases gradually, line 82, towards the boundary 84 between member 18 and medium 16; at boundary 84 the voltage decreases sharply through zero across medium 16, line 86, until it reaches the boundary 88 between medium 16 and member 20. At that point the voltage decreases slightly, line 90, until it reaches the point 92 at the interface of member 20 and electrode 24 which is at $-V_D$. During this first write period $W_1$ the voltage across medium 16, at area 26', as also the retardation, as shown by pulse 94, FIG. 9, is approximately equal to $V_D$ but decays slightly as indicated by the slope of line 96 forming the top of pulse 94. The relative optical transmission through detector 56, FIG. 6, is shown as being approximately one unit during that time as indicated at 98, FIG. 10.

Following write period $W_1$ is the first read/erase period $R_1$ which begins with the reversing of the polarity across electrodes 22 and 24 so that there is a $+V_D$ voltage on electrode 24 and a $+V_D$ voltage on electrode 22. This is indicated in FIG. 11 where at point 100 the voltage is $+V_D$ on member 20 and decreases slowly along line 102 toward boundary 88 where it begins decreasing more rapidly, passes through the zero line and encounters boundary 84 whereupon the decrease is much more gradual, line 106, until it reaches point 108 which is at $-V_D$. The voltage across area 26' of medium 16 $+V_M$, FIG. 9, now drops to $-V_M$ at 110 producing an opposite but equal retardation in area 26' which produces an equal and opposite elliptical polarization. The level of optical transmission, FIG. 10, continues at 98' since it is not the direction of retardation but the magnitude of retardation that effects the transmissivity. During this read/erase period, $R_1$, a read/erase pulse 112, FIG. 8, is produced by readout beam 48', FIG. 6. The radiation striking the particular area 26' causes medium 16 at that area to conduct heavily so that the negative charges 114, FIG. 11, migrate toward boundary 88, in the direction towards $+V_D$ at point 100 and the positive charges 116 migrate towards boundary 84 in the direction of the $-V_D$ voltage point 108. The voltage across medium 16 at area 26' then drops effectively to zero line 118 and the total voltage drop across the device 10 must be taken up in members 18 and 20 which now experience a steeper voltage gradient, lines 120 and 122, respectively. The drop in voltage across medium 16 and its retardation is indicated by line 124, FIG. 9, and is accompanied by a subsequent decrease in transmissivity as indicated by line 126, FIG. 10. This completes the initial, system-setting, cycle of operation; following this, beginning with the second write period $W_2$ the system operates in its normal mode.

At the beginning of the second write period $W_2$, FIG. 12, a positive signal is once again applied to electrode 22 and a negative voltage is applied to electrode 24. Thus the voltage at point 130, FIG. 12, is $+V_D$ and at point 132 is $-V_D$. However the voltage gradients indicated by lines 120 and 122 present in dielectric members 18 and 20, FIG. 11, are still present in those members and are indicated by the same numbers in FIG. 12. As a result these voltages are superimposed on the voltages applied to points 130 and 132 and the total voltage across medium 16 is a combination of the voltage at 130 plus the voltage across member 18 indicated by line 120 plus the voltage across member 20 indicated by line 22 plus the voltage of point 132. Since the voltages at 130 and 132 each have a magnitude of $V_D$ and since the voltages stored across members 18 and 20 are each approximately equal to $V_D$ the voltage across medium 16 is now $4V_D$ as indicated by line 134, FIG. 12. Thus the voltage $V_M$ and the retardation, FIG. 9, are twice what they were in the previous cycle as indicated by pulse 136, resulting in a transmissivity which is approximately four times that of the previous cycle as indicated by the level 138, FIG. 10. This condition remains for the entire write period of the second cycle apart from a small drop because there is no write laser pulse produced by laser 34. At the end of this part of the cycle the second read/erase period $R_2$ begins upon the switching of the voltage, FIG. 7, applied to electrodes 22 and 24. With a $+V_D$ applied to point 140 and a $-V_D$ at point 142 the voltages across dielectric 18 and 20 close on the zero line as indicated by the lines 120 and 122, respectively, but do not quite reach the zero voltage line because there has been some decay of the voltage in members 18 and 20 in the past period. This small deviation results in the negative pip 144, FIG. 9, in the voltage across medium 16 with a consequent small reversal of retardation.

The transmissivity at this point has dropped close to zero, FIG. 10. During the second read/erase period $R_2$ there occurs a second read/erase pulse 146, FIG. 8, from read out beam 48' which causes medium 16 to become highly conductive permitting the migration of charges 114 and 116 and reestablishing the zero electric field across medium 16 and eliminating pip 144, FIG. 9. The resulting field in members 18 and 20 and in medium 16 is shown by lines 148, 150 and 152, respectively, in FIG. 12. In the third cycle of operation the write period $W_3$ and read/erase period $R_3$ follow the same path as $W_2$ and $R_2$, FIG. 12, since there was no write pulse during the write period of either cycle.

The fourth cycle, FIG. 13, begins with a positive pulse from pulse generator 70 being applied to electrode 22 and negative pulse being applied to electrode 24. This places a $+V_D$ at point 154 and a $-V_D$ at point 156. Lines 148 and 150, counterparts of lines 120 and 122, each of which represents a voltage of $V_D$ across its respective members 18 and 20, are added to the $+V_D$ and $-V_D$, respectively, at points 154 and 156 so that once again the voltage across medium 16 is $4V_D$ as indicated by the line 158. This voltage is indicated by the pulse 160, FIG. 9, which represents the voltage $V_M$ across medium 16 at area 26' as well as the retardation imposed by it under these conditions. The transmissivity of area 26' at this time as indicated by pulse 162 has a magnitude of four units. However, during this fourth write period, $W_4$, a write pulse 164 does occur i.e., beam 32 is bright when it strikes subject area 26'. This causes medium 16 to become highly conductive at area 26' so that the negative and positive charges 114 and 116, respectively, previously captured during the time when electrode 22 was negative and electrode 24 positive, are now free to move under conditions of reverse polarity where electrode 22 as indicated at point 124 is a $+V_D$ and electrode 24 as indicated at point 126 is at $-V_D$. This results in the negative charges 114 approaching boundary 84 in the direction of a $+V_D$ voltage at point 154 and the positive charges 116 approaching boundary 88 in the direction of a $-V_D$ voltage at point 156.

Consequently, the voltage across medium 16 drops to zero as indicated by line 166 and the voltage $V_D$ which was stored in each of members 18 and 20 reverses in polarity. Thus the voltage across member 18 which previously became more positive as it approached boundary 84 as indicated by line 148 now becomes more negative as it approaches boundary 84 as indicated by line 168. Similarly the voltage across member 20 which previously became less negative as it moved away from boundary 88, as indicated by line 150, now becomes more negative as it moves away from boundary 88 as indicated by line 170. The voltage across medium at area 26′ $V_M$ has now descended along line 172, FIG. 9, to zero so that there is now zero retardation imposed by medium 16. The transmissivity, FIG. 10, has similarly decreased to zero as indicated by line 174 of pulse 162. Following this, in the read/erase period, $R_4$, of the fourth cycle a negative pulse of squarewave 72, FIG. 7, produced by pulse generator 70, FIG. 6, is applied to electrode 22, point 176, FIG. 14, and a positive pulse is applied to point 178. The voltages present in members 18 and 20, represented by lines 168 and 170, are shifted away from the zero line resulting in a voltage of $4V_D$, represented by line 180, across medium 16.

This voltage has the same magnitude as that previously present indicated by line 158, FIG. 13 and line 134, FIG. 12, except that it has reverse polarity i.e., where previously the voltage across medium 16 was from positive to negative going from member 18 to 20 it is now from negative to positive going in the same direction. This equal but opposite voltage is indicated by the pulse 182, FIG. 9, and produces a negative retardation which results, nevertheless, in the same, relative optical transmission of four units as indicated by pulse 184.

Now when a read/erase pulse 186, FIG. 8, is produced by readout beam 48′ it encounters not a zero voltage (or approximately zero voltage but for the deviation of pip 144) but a full reverse voltage of $4V_D$. Moreover in this case where the write pulse 164 has caused a reverse voltage across medium 16 there is present in medium 16 a voltage and a retardation at the time that the read/erase pulse occurs. Therefore there will be a high i.e., four units relative optical transmission, during the readout as indicated at point 187. Thus when there has been no write pulse during the write period the voltage and retardation and the transmissivity of the relative optical transmission of the area under discussion is zero (except for the pip). However when there is a write pulse such as write pulse 164, then the subsequent readout pulse 186 will encounter a full voltage across medium 16 and produce a substantial transmission of the readout radiation at that time. Since it is only at the readout time that detector circuits would be synchronized to seek transmission, it is at the time of this readout pulse that there must be transmission if the write pulse is to be recongnized. That is, in the previous three cycles of operation the area had high voltage across it and thus had high transmissivity at various times such as during write periods $W_2$ and $W_3$. However no read pulse occurs at that time. The read pulse occurs during the read/erase portion of the cycle i.e., period $R_1$, $R_2$, and $R_3$ and at this time there is no transmissivity: there is no retardation and no voltage across area 26′ of medium 16 unless previously there has been a write pulse such as 164.

Readout pulse 186 in addition to producing the radiation on which the retardation indicated in FIG. 9 at 182 is imposed, also causes medium 16 to become highly conductive again so that negative charges 114 are once again free to migrate toward boundary 88 and the positive charges 116 are free to migrate toward boundary 84. This results in the voltage across medium 16 dropping to zero as indicated by line 188, 190 and the voltage $V_D$ across members 18 and 20 being applied in the reverse direction as indicated by lines 192 and 194, respectively. The voltage distribution as indicated by lines 194, 192 and 190 has once again assumed the position indicated by lines 150, 152 and 148 in FIG. 12 and is ready to begin another write operation. This action erases the fields and thus the information present at area 26′ of medium 16.

The system continues in this manner through the fifth, sixth and subsequent cycles in the same manner. A unique advantage of reversing the polarity on alternate write and read/erase periods is that the retention characteristic of the blocking electrodes e.g. dielectric members 18 and 20 may be used to double the voltage applied across the photosensitive electro-optic medium. Doubling of this voltage results in an approximate quadrupling of the transmissivity with respect to the polarized detector which increases light output and produces substantial contrast between light and dark conditions, as well as at intermediate conditions, to produce a workable system.

Another unique advantage is that the read pulse acts as an erase pulse so that a separate erase cycle is unnecessary. Thus additional erase mechanisms and the additional time otherwise required to perform the erase operation are not necessary. This is an extremely valuable asset of the system especially when it is being used in high speed applications such as described wherein the voltage across electrodes 22 and 24 is being switched twice each cycle or at the rate of 20,000 times per second. The write operation takes place in one portion of a singe cycle and the read/erase operation takes place during another portion of the same cycle. All 10,000 discrete areas or information locations of device 10 are written on in $0.5\times10^{-4}$ seconds at the rate of one every $0.5\times10^{-8}$ seconds or $2\times10^{8}$ bits per second and then a read pulse occurs during the same cycle to simultaneously readout all $10^4$ locations at some point during a half cycle occurring in $0.5\times10^{-8}$ seconds. Since there are 10,000 bits written in and one readout of the entire 10,000 bits each cycle the information exchange rate of the system is $10^8$ bits per second.

For use as a page composer the system of FIG. 6 may have an image formed by all of the $10^4$ locations being readout simultaneously by the readout beam 48′ projected onto a memory 200 such as a MnBi layer as described in the references cited in the Background of this application. In that case the image formed from the information present in device 10 including all 10,000 bits of information represent one page of information and device 10 may be considered a page composer.

A reference beam 202 derived from the same laser as the readout beam 48′ is then made to interfere with that image at memory 200 so that a hologram 204 is formed at that point. Memory 200 typically contains 10,000 such pages of information each containing 10,000 bits of information so that memory 200 can contain $10^8$ bits of information in an area which is approximately 8 inches square or 64 square inches. Readout of memory 200 may be accomplished by directing a coherent radiation beam at the spot at which is located the hologram 204 of the page containing the desired information image. This image is then directed from memory 200 back through a device having an array of photosensitive detectors for the purpose of extracting the stored information. Alternatively the information could be obtained on readout by forming a reconstruction of the hologram onto device 10 or a similar device and scanning it with a laser beam.

Figure 15:
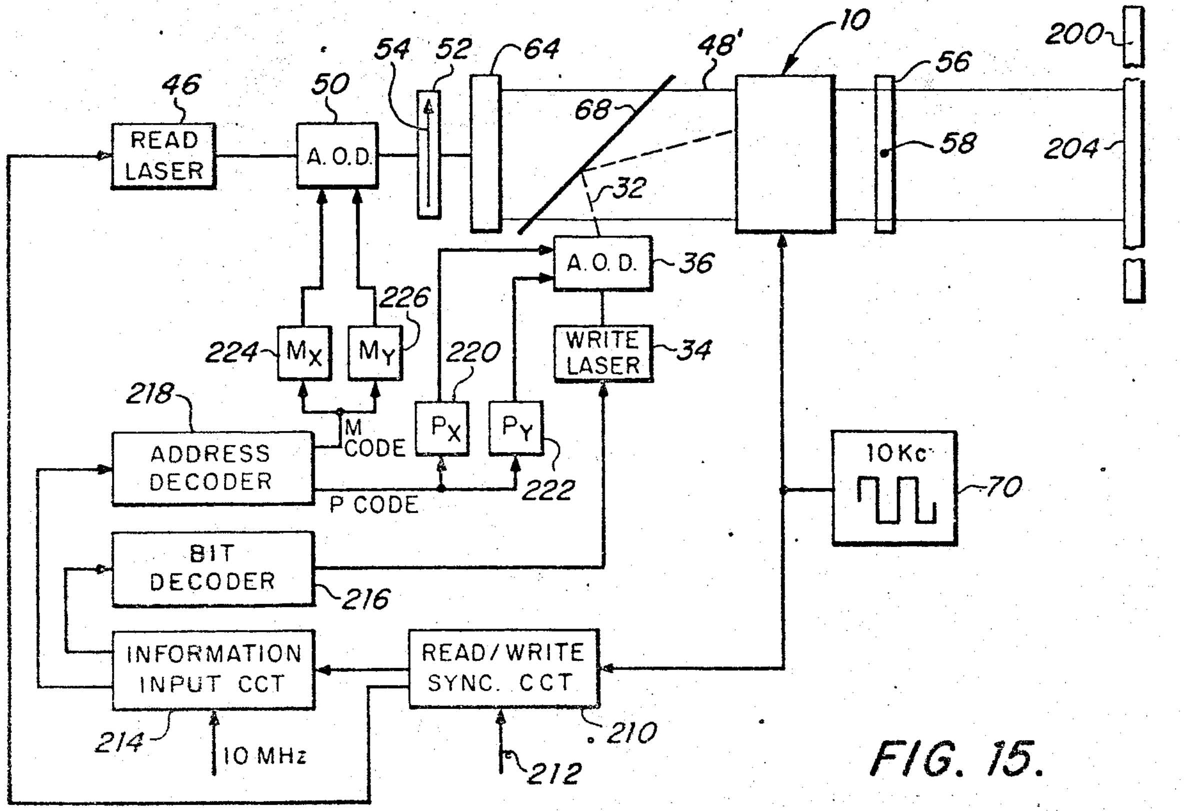
FIG. 15 is a schematic block diagram of a control circuit which may be used to operate the system of FIG. 6.

An example of the controls which may be used to operate the system of FIG. 6 is shown in FIG. 15. Pulse generator 70 provides an output to drive device 10 and also provides an input to read/write synchronizer circuit 210. Read and write commands are submitted over line 212 to circuit 210. On a positive pulse from pulse generator 70 and a write command on line 212, circuit 210 provides an output to information input circuit 214 which typically is designed to receive information at the rate of 100 MHz. Information input circuit 214 divides the information into data, which is directed to bit decoder 216, and address information, which is directed to address decoder 218. Bit decoder 216 provides an output to write laser 34 indicating for each bit whether laser 34 is to be in a bright or a dark condition. Address decoder 218 provides X and Y axis information: page X axis to drive circuit 220 and page Y axis to drive circuit 222 whose outputs drive the acousto-optical-deflector 36 to place the bit information at the proper bit locations on the page being composed in device 10. The M code output from address decoder 218 is directed to the memory X axis drive 224 and the memory Y axis drive 226 which direct the acousto-optical-deflector 50 to direct the readout beam 48' to the page position on memory 200 on which this particular page being composed is to be stored. The direction to energize the read and erase laser 46 after the writing is completed and the page image is totally composed in device 10 comes from circuit 210 when a read pulse is present on line 212 in conjunction with a negative pulse being delivered by pulse generator 70.

Although the imaging system of this invention has been illustrated with respect to a high speed page composer this is not a limitation of the invention for it may be used in any imaging application. For example, one application which utilizes the high speed operation of the system is an optical information processing system wherein some spatial information generated as output by a computer and displayed on a CRT is used to write an image into a device according to this invention. The readout of the device may be accomplished using a laser to produce a Fourier transform of that image and the radiant image of the Fourier transform may be applied to a second device according to this invention to produce an image therein of that transform. A second CRT also driven by the same computer may then be used to vary the image in the second device in order to add or subtract certain frequencies or other qualities from the Fourier transform, present in that second device. Following this a readout of the second device may be accomplished in which a Fourier transform of the Fourier transform is produced so that the original image, as modified, appears at a detector which is connected to the input of the computer. Thus the computer can be operated at extremely high speed to process information images in accordance with a predetermined algorithm without the requirement for buffering and without requiring the computer to operate at slower speeds.

Another application which utilizes the buffer image memory property of the device in graphic arts photocomposers wherein computer derived instructions are used to electro-mechanically generate alpha-numeric characters in the form of light patterns which are then used to expose photosensitive materials. In such a system the device may be used to store character images generated by a CRT or deflected laser beam and subsequently transfer these images in parallel fashion onto a photosensitive material by imagewise modulating a high intensity readout source. The buffer memory property permits the character generation cycle and character positioning cycle to take place simultaneously.

Other embodiments will occur to those skilled in the art and are within the following claims:

What is claimed is:

1. A method of imaging information comprising:

applying a voltage across an electro-optic device having an optical characteristic which varies in response to variations in an applied electric field said device having a plurality of addressable locations;

periodically reversing the polarity of that applied voltage;

selectively varying the electric field within said device at said location for placing information in said device at each location during a period when said voltage applied to said device has a first polarity;

submitting readout radiation to said device during a period in which said voltage applied to said device has a second polarity; and detecting modulation, imposed on said readout radiation by said optical characteristic, representative of the information present in said device.

2. An electro-optic imaging system comprising:

an electro-optic device having an optical characteristic which varies in response to variations in an applied electric field;

means for applying a voltage across said device and periodically reversing the polarity of that applied voltage;

means for varying the electric field within said device for placing information in said device during a period in which said voltage applied to said device has a first polarity;

means for submitting readout radiation to said device during a period in which said voltage applied to said device has a second polarity; and means for detecting modulation, imposed on said readout radiation by said optical characteristic, representative of the information present in said device.

3. An electro-optic imaging system comprising an electro-optic device including first and second spaced blocking electrodes, a photosensitive electro-optic birefringent medium whose birefringence varies in response to variations in an applied electric field, disposed between said electrodes, said device having a plurality of addressable locations;

means for applying a voltage across said device and periodically reversing the polarity of that applied voltage;

means for selectively varying the electric field across said medium at said location for placing information in said medium at each location during a period when said voltage applied to said device has a first polarity;

means for submitting readout radiation to said device during a period in which said voltage applied to said device has a second polarity; and means for detecting modulation, imposed on said readout radiation by said optical characteristic, representative of the information present in said device.

4. An electro-optic imaging system comprising:

an electro-optic device including a photosensitive electro-optic birefringent medium whose birefringence varies as a function of an applied electrical field;

means for applying a voltage across said device and periodically reversing the polarity of that applied voltage;

means for selectively varying the electric field across said medium for placing information in said medium during a period in which said voltage applied to said device has a first polarity;

means for submitting readout radiation to said device during a period in which said voltage applied to said device has a second polarity; and means for detecting modulation imposed on said readout radiation by the electrically induced birefringence of said medium representative of the information present in said device.

5. An electro-optic imaging system comprising:

an electro-optic device including first and second spaced blocking electrodes and an electro-optic medium, disposed between said electrodes, having an optical characteristic which varies in response to variations in an applied electric field, said device having a plurality of addressable locations;

means for applying a voltage across said device and periodically reversing the polarity of that applied voltage;

means for selectively varying the electric field across said medium at said addressable locations during a period in which said voltage applied to said device has a first polarity;

means for submitting read-out radiation to said device during a period in which said voltage applied to said device has a second polarity; and, means for detecting modulation imposed on said read-out radiation by said optical characteristic, representative of the information present in said device.

6. An electro-optic imaging system of claim 5 wherein said electro-optic medium comprises a photosensitive, electro-optic medium whose birefringence varies in response to variations in an applied electric field.

7. An electro-optic imaging system of claim 6 wherein said means for applying includes a voltage source for periodically switching the polarity of the voltage applied to said electrodes.

8. An electro-optic imaging system of claim 7 wherein at least one of said blocking electrodes comprises a dielectric member in combination with a conducting electrode.

9. An electro-optic imaging system of claim 8 wherein said means for selectively varying the electric field across said medium includes an electron beam source.

10. An electro-optic imaging system of claim 9 wherein said means for selectively varying the electric field across said medium includes a phosphor layer disposed between said electron beam source and said medium.

11. An electro-optic imaging system of claim 8 wherein said means for selectively varying the electric field across said medium includes a laser.

12. An electro-optic imaging system of claim 11 wherein said means for selectively varying the electric field across said medium includes deflector means for directing the laser beam from said laser to one or more of said addressable locations.

13. An electro-optic imaging system of claim 11 wherein said means for submitting radiation includes means for supplying radiation simultaneously to a plurality of said addressable locations.

14. An electro-optic imaging system of claim 13 wherein said means for submitting readout radiation includes a source of radiation which is polarized in a first direction.

15. An electro-optic imaging system of claim 14 wherein said means for detecting includes polarizing means polarized in a second direction.

16. An electro-optic imaging system of claim 15 wherein said electrodes are transparent.

17. An electro-optic imaging system of claim 16 wherein one of said electrodes is transparent and the other is highly reflective.

* * * * *